United States Patent [19]

Hayama et al.

[11] Patent Number: 4,736,813
[45] Date of Patent: Apr. 12, 1988

[54] CRUISE CONTROL SYSTEM FOR VEHICLE

[75] Inventors: Mamoru Hayama; Toshiyuki Higuchi; Kazuhiko Ohbatake, all of Hiroshima, Japan

[73] Assignee: Mazda Motor Corporation, Japan

[21] Appl. No.: 851,484

[22] Filed: Apr. 14, 1986

[30] Foreign Application Priority Data

Apr. 16, 1985 [JP] Japan .................. 60-80901
Apr. 16, 1985 [JP] Japan .................. 60-80908

[51] Int. Cl.$^4$ ............................................. B60K 31/00
[52] U.S. Cl. .................................... 180/177; 74/866; 180/179
[58] Field of Search ............... 180/179, 175, 176, 177, 180/178; 318/587; 123/352; 74/866

[56] References Cited

U.S. PATENT DOCUMENTS

| | | | |
|---|---|---|---|
| 4,046,213 | 9/1977 | Larson | 180/177 |
| 4,421,192 | 12/1983 | Ito et al. | 180/179 |
| 4,463,822 | 8/1984 | Tanigawa et al. | 180/179 |
| 4,516,652 | 5/1985 | Tanigawa et al. | 180/177 |
| 4,535,865 | 8/1985 | Tanigawa et al | 180/179 |

Primary Examiner—David M. Mitchell
Attorney, Agent, or Firm—Gerald J. Ferguson, Jr.; Michael P. Hoffman; Michael J. Foycik, Jr.

[57] ABSTRACT

A cruise control system for a vehicle having an automatic transmission comprises a constant speed driving device having an actuator for changing the amount of fuel to be fed to the engine, a first controller for controlling the actuator to control the amount of fuel to be fed to the engine so that the vehicle speed is fixed at a set speed, a manually operated switch for delivering to the actuator an override command for changing the vehicle speed from the set speed; a downshifting solenoid for downshifting the automatic transmission; and a second control means which permits the downshifting solenoid to downshift the automatic transmission a predetermined delay time after the manually operated switch is operated.

18 Claims, 8 Drawing Sheets

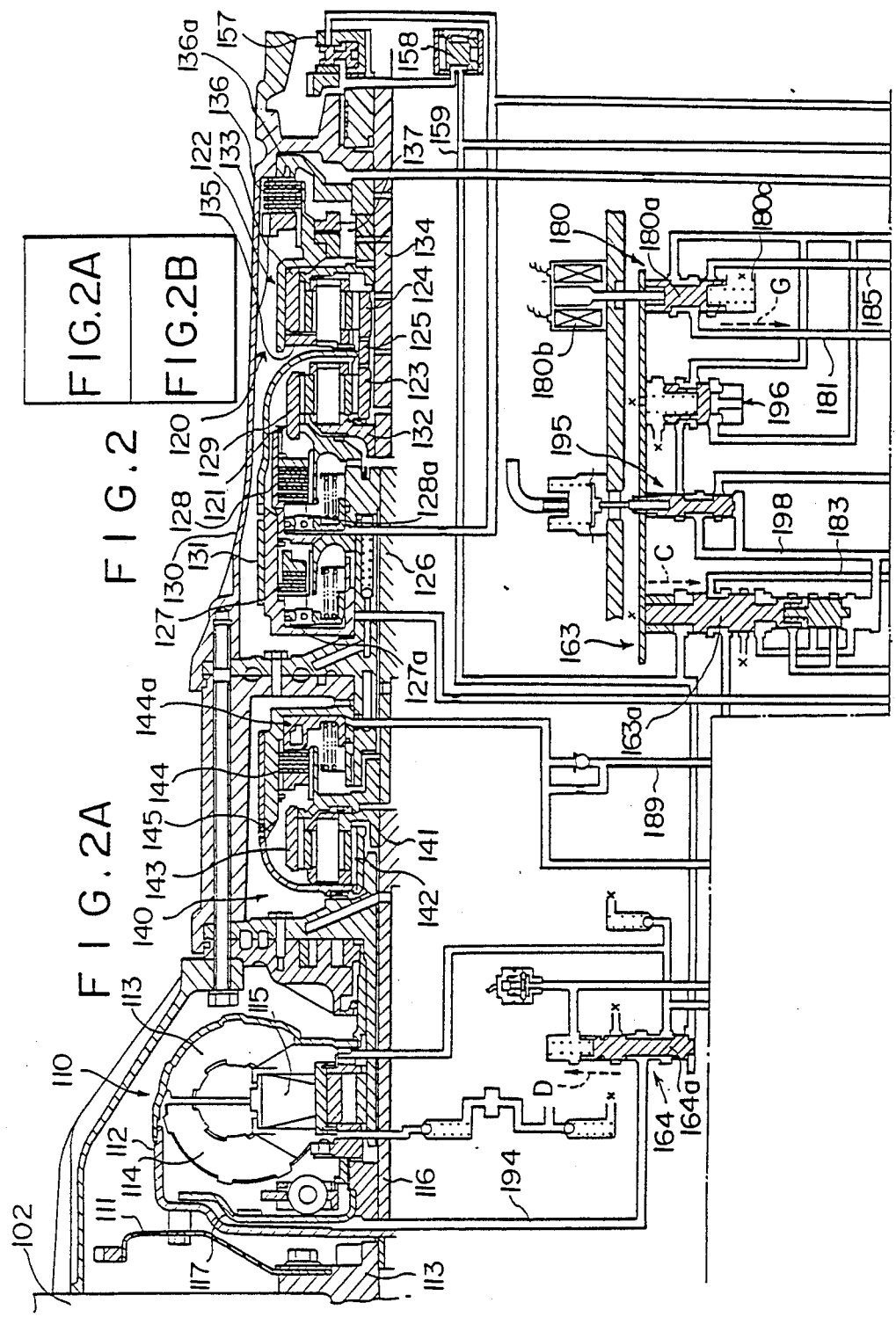

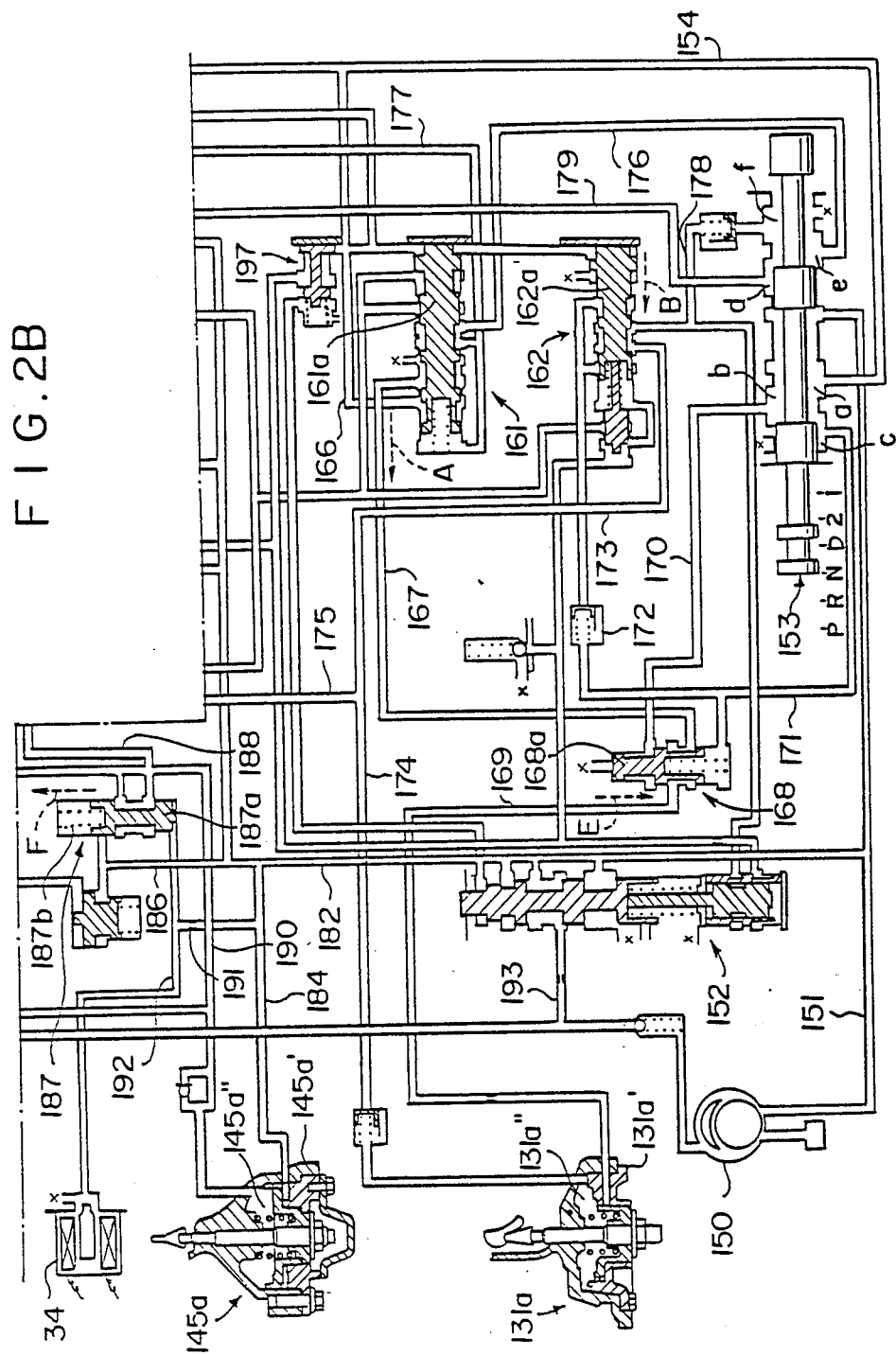

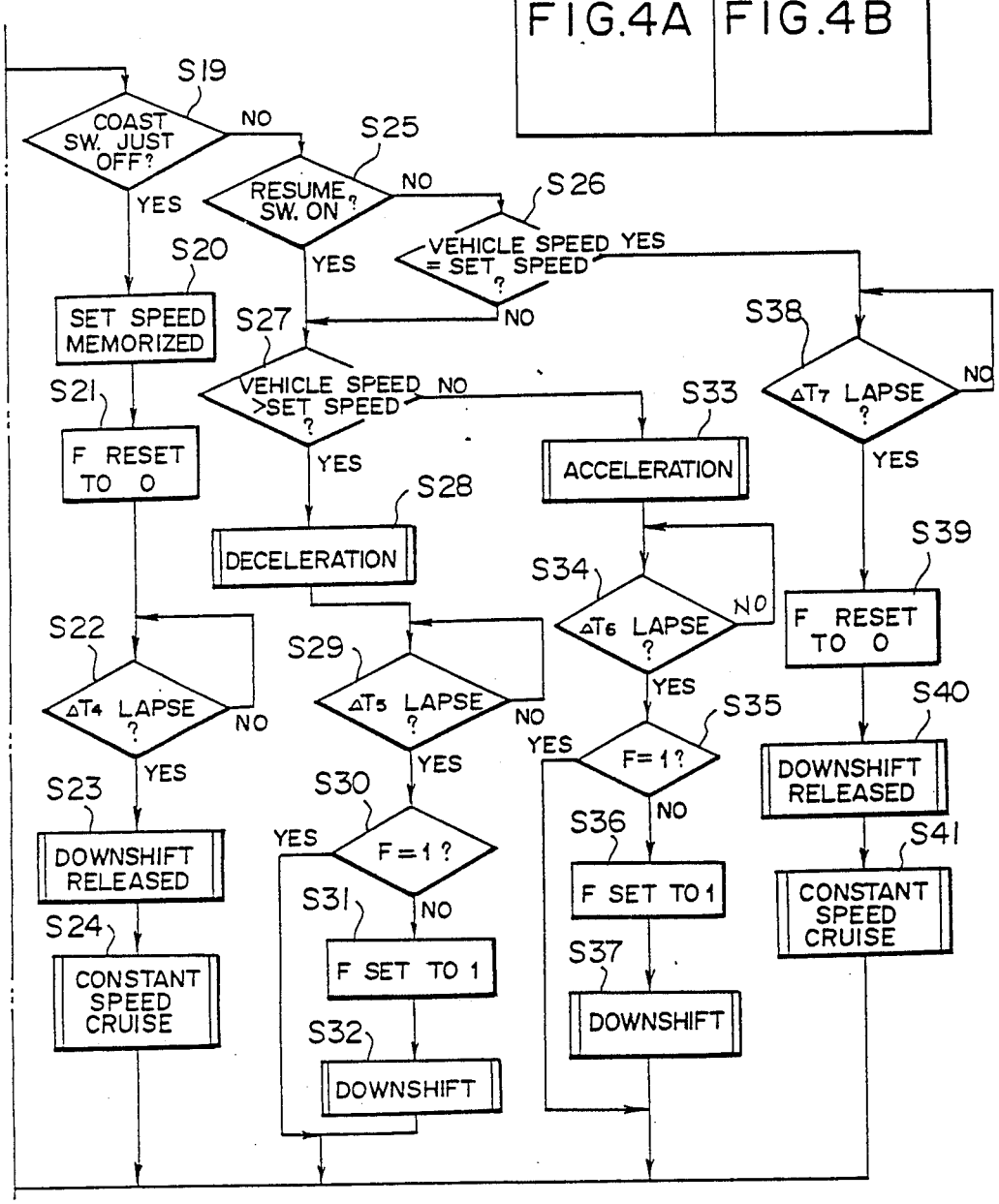

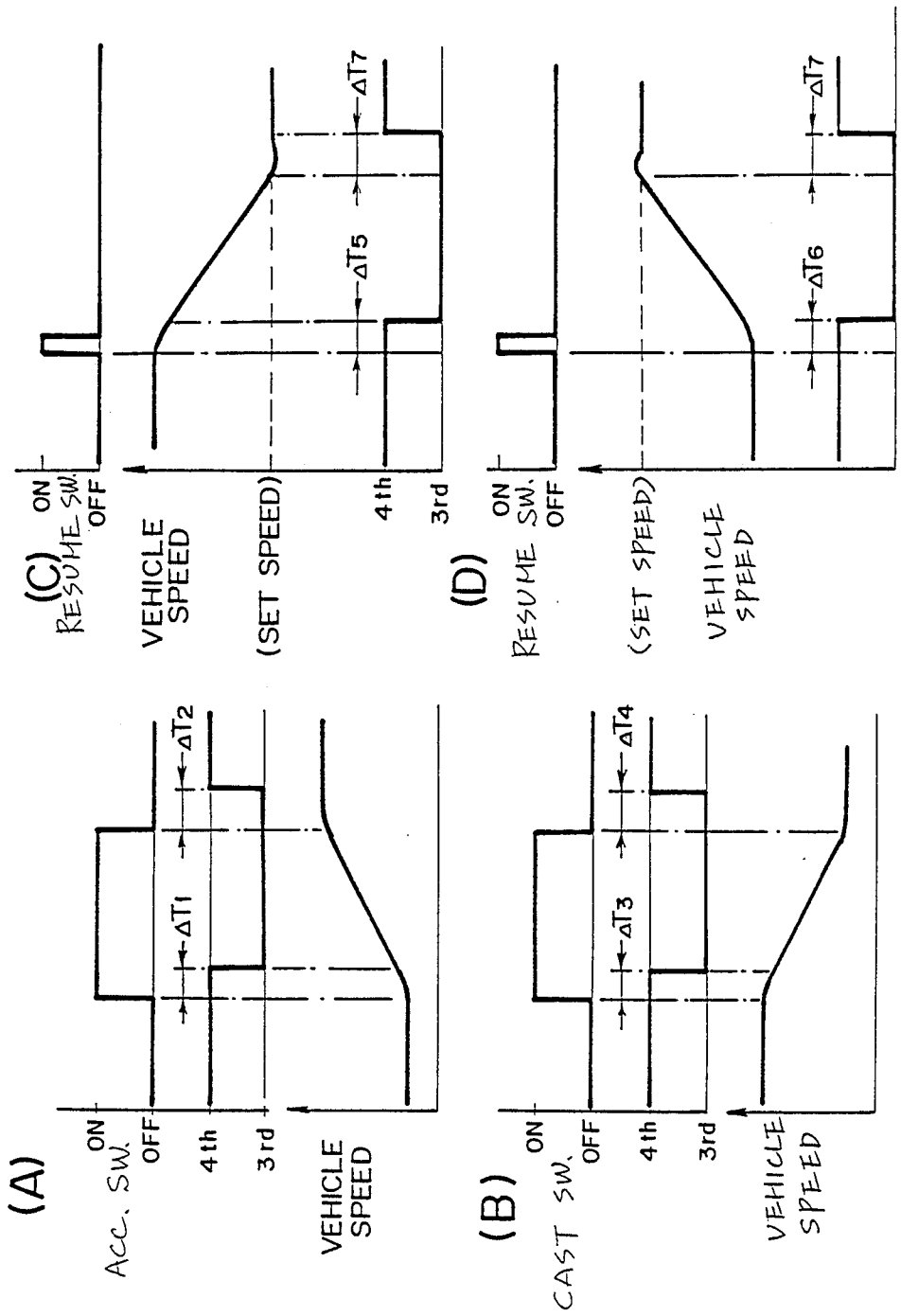

CRUISE CONTROL SYSTEM FOR VEHICLE

BACKGROUND OF THE INVENTION

1. Field of the Invention

This invention relates to a cruise control system for a vehicle which automatically maintains a desired vehicle speed, and more particularly to such a cruise control system for an automatic transmission vehicle.

2. Description of the Prior Art

Recently, there has been put into practice a cruise control system which automatically keeps the vehicle speed at a desired speed set by the driver. In the control system, when the vehicle speed reaches a desired speed, the driver operates a setting means and thereafter, the throttle valve of the engine is automatically controlled according to the difference between the desired speed and the actual vehicle speed to maintain the desired speed.

Generally, the cruise control system is required to have four functions, a vehicle speed set function, an increase set function, a decrease set function, and a resume function. The vehicle speed set function is to fix the vehicle speed at the speed at the moment when the setting means, e.g., a vehicle speed set switch, is operated. The increase set function is to increase the set vehicle speed and is accomplished by, for instance, pushing an acceleration switch. The set vehicle speed is increased while the acceleration switch is kept depressed, and when the acceleration switch is released, the vehicle speed is fixed or set to what the speed was at the moment the acceleration switch was released. The vehicle speed set switch and the increase set switch are generally combined into a single switch so that when the single switch is momentarily pushed, the vehicle speed is fixed at what the speed was at the moment the switch was pushed, and when the switch is kept depressed, the vehicle speed is increased until the switch is released and the vehicle speed is fixed to what the speed was at the moment the switch was released. The decrease set function is to decrease the set vehicle speed and is accomplished by, for instance, pushing a coast switch. The set vehicle speed is gradually decreased while the coast switch is kept depressed, and when the coast switch is released, the vehicle speed is fixed or set to what the speed was at the moment the coast switch was released. The resume function is to resume, when the constant speed cruising is interrupted by a predetermined operation, e.g., operation of the brake pedal, the vehicle speed set before the interruption of the constant speed cruising. The resume function is accomplished by pushing a resume switch which causes the vehicle speed to revert to the speed set before the interruption of the constant speed cruising and to be fixed at the speed.

In U.S. Pat. No. 4,535,865, there is disclosed a cruise control system for a vehicle having an automatic transmission in which the transmission is downshifted by one speed to increase engine output torque when the vehicle is accelerated by the increase set function or the resume function, thereby improving acceleration during the increase set function or the resume function in the case of ascending a slope, for example.

However, the cruise control system of the United States patent is disadvantageous in that the acceleration effect due to the increase in the throttle opening by the increase set function or the resume function acts simultaneously with the acceleration effect due to the increase in the engine output torque by the downshifting, abruptly increasing acceleration force, thereby generating a shock effect at the beginning of the acceleration which adversely affects riding comfort.

On the other hand, in Japanese Unexamined patent publication No. 58(1983)-163022, there is disclosed a cruise control system for a vehicle having an automatic transmission in which the transmission is downshifted to increase the engine brake effect when the vehicle is decelerated by the decrease set function, thereby improving the deceleration effect during the decrease set function in the case of descending a slope, for example.

However, the cruise control system of the Japanese patent publication is disadvantageous in that the deceleration effect due to the reduction in the throttle opening by the decrease set function acts simultaneously with the deceleration effect of the downshifting to abruptly increase the deceleration force, thereby generating a shock effect which adversely affects the driving comfort.

SUMMARY OF THE INVENTION

In view of the foregoing observations and description, the primary object of the present invention is to provide a cruise control system for an automatic transmission vehicle in which, when the vehicle is to be accelerated in response to the increase set function, satisfactory acceleration performance can be obtained by virtue of increasing the throttle opening and downshifting without generating any shock effects at the beginning of the acceleration.

Another object of the present invention is to provide a cruise control system for an automatic transmission vehicle in which, when the vehicle is to be decelerated in response to the decrease set function, satisfactory deceleration performance can be obtained by virtue of decreasing the throttle opening and downshifting without generating any shock effects at the beginning of the deceleration.

The cruise control system in accordance with the present invention comprises, as shown in FIG. 7, a constant speed driving device having an actuator for changing the amount of fuel to be fed to the engine, a first control means for controlling the actuator to control the amount of fuel to be fed to the engine so that the vehicle speed is fixed at a set speed, a manually operated switch means for delivering to the actuator an override command for changing the vehicle speed from the set speed; a downshifting means for downshifting the transmission; and a second control means which permits the downshifting means to downshift the transmission a predetermined delay time after the manually operated switch means is operated.

BRIEF DESCRIPTION OF THE DRAWINGS

FIG. 2 is a view illustrating the automatic transmission employed in the embodiment of FIG. 1, FIG. 6 shows the relation between the condition of each of the manually operated switches, the transmission speed and the vehicle speed in the circuit shown in FIG. 5.

DESCRIPTION OF THE PREFERRED EMBODIMENT

Figure 1:
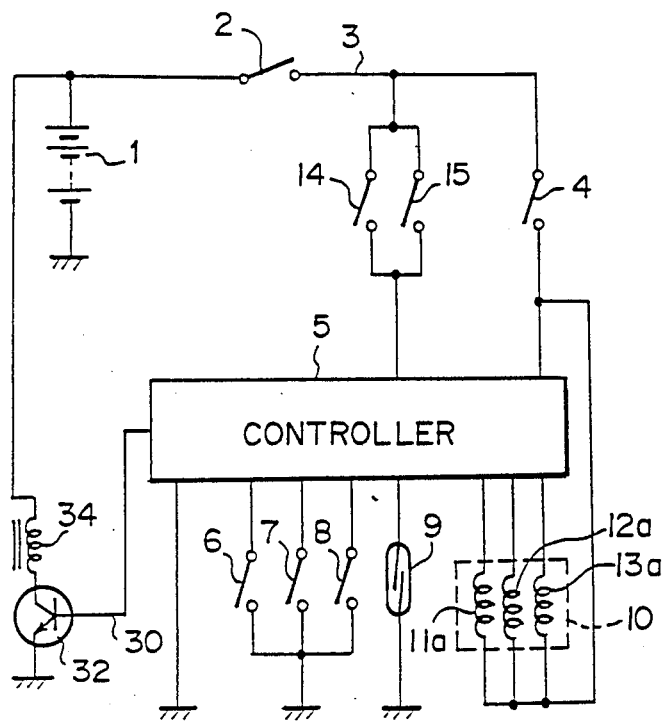
FIG. 1 is a schematic circuit diagram of a cruise control system in accordance with an embodiment of the present invention.
Figure 7:
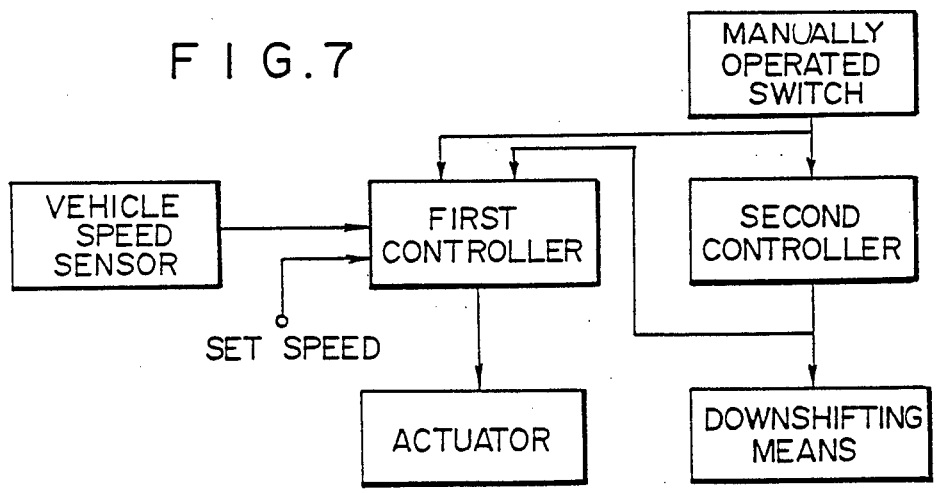
FIG. 7 is a schematic view showing the general arrangement of the cruise control system in accordance with the present invention.

In FIG. 1, a cruise control system for a vehicle having an automatic transmission in accordance with an embodiment of the present invention comprises a controller 5 connected to a power circuit 3, which leads to a power source 1 by way of an ignition switch 2, by way of a main switch 4. Signals from an acceleration switch 6, a coast switch 7, a resume switch 8 and a vehicle speed sensor 9 are input into the controller 5 and signals are output to solenoids 11a, 12a and 13a of an actuator 10 from the controller 5.

The acceleration switch 6, coast switch 6 and resume switch 8 are connected in parallel between the controller 5 and the ground. The acceleration switch 6 functions as both the vehicle speed set switch and the increase set switch described above. That is, when the acceleration switch 6 is turned on and the immediately turned off while the vehicle speed is between 40 Km/h and 100 Km/h, the vehicle speed is set to or fixed at what the speed was when the acceleration switch 6 was pushed. On the other hand, when the acceleration switch 6 is kept on, the vehicle speed is continuously increased until the switch 6 is turned off and the vehicle speed is fixed at what the speed was at the moment the switch 6 was turned off. The coast switch 7 is for decreasing the set speed. When the coast switch 7 is turned on during the constant speed cruising, the speed is reduced until the coast switch 7 is turned off. The resume switch 8 is turned on to return the vehicle speed to the set speed in the case that the constant speed cruising is released by an operation other than the turning-off of the main switch 4. According to the signals from the switches 6, 7 and 8 and the signals from the vehicle speed sensor 9, the controller 5 delivers to the solenoids 11a, 12a and 13a of the actuator 10 a signal which maintains the set vehicle speed, increases the vehicle speed, decreases the vehicle speed or returns the vehicle speed to the set speed.

Further, a selector lever position switch 14 and a brake switch 15 are connected in parallel between the controller 5 and the power circuit 3. The selector lever position switch 14 is turned on when the selector lever of the automatic transmission is put in N (neutral), R (reverse) or P (parking), and the brake switch 15 is turned on when the brake pedal is operated. When at least one of the switches 14 and 15 is turned on, a constant speed releasing signal is delivered to the controller 5 to interrupt the constant speed cruising.

An output line 30 of the controller 5 is connected to the base of a transistor 32. The collector of the transistor 32 is connected to a downshifting solenoid 34 which will be described in detail later and the emitter of the same is grounded. The downshifting solenoid 34 is further connected to the power source 1 so that when an on-signal is input into the transistor 32 from the controller 5 through the output line 30, the downshifting solenoid 34 is energized. The downshifting solenoid 34 actuates a hydraulic control valve of the automatic transmission (which is described in detail with reference to FIG. 2) to downshift the transmission by one speed, for instance, from fourth to third when energized.

In FIG. 2, the automatic transmission comprises a hydraulic torque converter 110, a multiple stage transmission gear mechanism 120, and a planetary gear type over-drive transmission mechanism 140 arranged between the torque converter 110 and the multiple stage transmission gear mechanism 120.

The torque converter 110 has a pump 113 connected to an output shaft 103 of an engine 102 through a drive plate 111 and a converter casing 112, a turbine 114 provided in the casing 112 to face to the pump 113 and a stator 115 disposed between the pump 113 and the turbine 114. A converter output shaft 116 is connected to the turbine 114. A lock-up clutch 117 is provided between the converter output shaft 116 and the casing 112 which is connected to the pump 113. The lock-up clutch 117 is normally engaged with the casing 112 under the pressure of a hydraulic fluid which circulates in the torque converter 110, and is released by hydraulic pressure which is drawn to a space between the casing 112 and the clutch 117 from an external pressure source.

The multiple stage transmission gear mechanism 120 has a front planetary gear unit 121 and a rear planetary gear unit 122. The front planetary gear unit 121 has a sun gear 123 connected with a sun gear 124 of the rear planetary gear unit 122 by way of a connecting rod 125. The gear mechanism 120 has an input shaft 126 connected through a front clutch 127 with the connecting rod 125 and through a rear clutch 128 with an internal gear 129 of the front planetary gear unit 121. A front brake 131 is provided between the connecting rod 125 or the sun gears 123 and 124 of the gear units 121 and 122, and a casing 130 of the transmission. The gear mechanism 120 also has an output shaft 134 connected with a planetary carrier 132 of the front planetary gear unit 121 and an internal gear 133 of the rear planetary gear unit 122. The rear planetary gear unit 122 has a planetary carrier 135, and there are provided between the planetary carrier 135 and the transmission casing 130 a rear brake 136 and a one-way clutch 137.

The planetary gear type over-drive transmission mechanism 140 includes planetary gears 141a a planetary carrier 141 rotatably carrying the planetary gears 141a and connected with the output shaft 116 of the torque converter 110, a sun gear 142 engaged with the planetary gears 141a, and an internal gear 143 which is also engaged with the planetary gears 141a and connected with the sun gear 142 through a direct connecting clutch 144. An over-drive brake 145 is provided between the sun gear 142 and the transmission casing 130. The internal gear 143 is connected with the input shaft 126 of the multiple stage transmission gear mechanism 120.

The multiple stage transmission gear mechanism 120 is of a known type and can provide three forward speeds and one reverse. The planetary gear type over-drive transmission mechanism 140 connects the shafts 116 and 126 directly when the direct connection clutch 144 is engaged and the brake 145 is released, and provides an over-drive connection between the shafts 116 and 126 when the brake 145 is engaged and the clutch 144 is released.

As shown in FIG. 2, the automatic transmission is provided with a hydraulic control circuit. The hydraulic control circuit has an oil pump 150 which is driven by the engine output shaft 103 through the torque converter 110. Hydraulic oil is discharged under pressure from the pump 150 into a pressure line 151. The oil pressure is reduced by a pressure regulating valve 152 and applied to a select valve 153. The select valve 153 has a plunger which can be selectively positioned in one of shift positions 1, 2, D, N, R and P. When the select valve 153 is positioned in the position D, the pressure line 151 is communicated with the ports a, b and c of the select valve 153. In the position 2, the pressure line 151 is communicated with the ports a, b and d of the select valve 153 whereas in the position 1, the line is communicated with the ports a, d and e. In the position R, the line 151 is communicated with the ports d, e and f. The port a is communicated through a line 154 with a hydraulic actuator 128a for the rear clutch 128. It will be understood that when the select valve 153 is positioned in any one of the positions D, 2 and 1, the actuator 128a causes the rear clutch 128 to engage.

The line 154 from the port a is connected with a second governor valve 157 which is provided on the output shaft 134 of the transmission gear mechanism 120. The second governor valve 157 has an output port connected with a first governor valve 158 which is also provided on the output shaft 134. The first governor valve 158 has an output port connected with a governor pressure line 159. The governor valves 157 and 158 produce a governor pressure which is substantially proportional to the rotating speed of the output shaft 134. The governor pressure line 159 is connected with a 1-2 shift valve 161, a 2-3 shift valve 162, a 3-4 shift valve 163 and a lock-up valve 164 to apply the governor pressure to these valves so that spools 161a, 162a, 163a and 164a of these valves are forced respectively in the directions shown by arrows A, B, C and D.

The port a is also communicated through a line 166 branched from the line 154 with the 1-2 shift valve at a port which is communicated with a line 167 when the spool 161a is shifted in the direction of the arrow A under the governor pressure introduced at the right hand end of the spool 161a. The line 167 leads to a second lock valve 168 having a spool 168a which is urged upward by a spring. With the select valve 153 in the position D, hydraulic pressure is applied from the ports b and c through lines 170 and 171 respectively to the second lock valve 168 and the hydraulic pressure functions to keep the spool 168a in the position shown in FIG. 2. In this position of the spool 168a, the line 167 is communicated with a line 169 leading to an engaging port 131a' of an actuator 131 for the front brake 131. It will be understood that when the spool 162a the 1-2 shift valve 162 is moved in the direction of the arrow A, hydraulic pressure is led to the engaging port 131a' of the actuator 131a to cause the front brake 131 to engage.

The line 171 from the port c of the select valve 153 is connected through an orifice check valve 172 with the 2-3 shift valve 162 at a port which is communicated with a line 173 when the spool 162a is moved in the direction of the arrow B under the governor pressure applied to the right hand end of the spool 162a. The line 173 is branched into lines 174 and 175, the line 174 being connected to a release port 131a'' of the actuator 131a for the front brake 131 and the line 175 to an actuator 127a for the front clutch 127. It will be understood that the front brake 131 is released and the front clutch 127 is engaged when the spool 162a of the 2-3 shift valve 162 is moved to the left position under the governor pressure.

The port c of the select valve 153 is disconnected from the pressure line 151 when the select valve 153 is in the position 2. Since the port b is still in communication with the pressure line 151, the spool 168a of the second lock valve 168 is moved in the direction of arrow E to thereby connect the line 169 with the line 170. Thus, hydraulic pressure is introduced through the lines 170 and 169 to the engaging port 131a' of the actuator 131a to cause the front brake 131 to engage irrespective of the position of the spool 161a of the 1-2 shift valve 161.

The port e is connected with the pressure line 151 when the select valve 153 is in either one of the positions 1 and R. The port e is connected through a line 176 to the 1-2 shift valve 161 at a port which is communicated with a line 177 when the spool 161a is in the right position as shown in FIG. 2. Thus, in this position of the spool 161a, the rear brake 136 is engaged under a hydraulic pressure applied through the line 177 to an actuator 136a.

The select valve 153 further has a port f which is communicated with the pressure line 151 when the select valve 153 is in the position R. The port f is connected through a line 178 with the 2-3 shift valve 162 at a port which is communicated with the line 173 when the spool 162a is in the position at the right shown in FIG. 2. Thus, hydraulic pressure is applied in the position R to the actuator 127a to engage the front clutch 127. The hydraulic pressure is also applied to the release port 131a'' of the actuator 131a, though the pressure does not provide any change in the actuator 131a because it has been in the release position since it is not supplied with hydraulic pressure at the engaging port 131a' in the position R of the select valve 153.

The port d which is in communication with the pressure line 151 in any one of the positions 2, 1 and R is connected with a line 179 leading to a kick-down valve 180. The valve 180 has a spool 180a which is urged upward by a spring 180c and actuated by a kick-down solenoid 180b. In the upward position of the spool 180a, the valve 180 connects the line 170 with a line 181 which leads to the 1-2 shift valve 161, the 2-3 shift valve 162 and the 3-4 shift valve 163. When the hydraulic pressure is applied from the line 181, spools 161a, 162a and 163a of the respective valves 161, 162 and 163 are held in the positions shown in FIG. 2.

The pressure line 151 is further connected with a branch line 182 which leads through lines 183, 184, 185 and 186 respectively to the 3-4 shift valve 163, an engaging port 145a' of an actuator 145a for the overdrive brake 145, the kick-down valve 180 and an overdrive release valve 187. The line 183 leading to the 3-4 shift valve 163 is communicated through a line 188 with the overdrive release valve 187 when the spool 163a of the shift valve 163 is in the position shown in FIG. 2. The line 188 is communicated, when the spool 187a of the valve 187 is in the position shown in FIG. 2, through lines 189 and 190 respectively with an actuator 144a for the direct drive clutch 144 and a release port 145a'' of the actuator 145a for the overdrive brake 145. It will be understood that, in the positions of the valves shown in FIG. 2, the direct drive clutch 144 is engaged and the overdrive brake 145 is released. When the spool 163a of the 3-4 shift valve 163 is moved in the direction of the arrow C under the governor pressure, the line 183 is disconnected from the line 188 and the line 188 is opened to the drain port. Therefore, the pressure is released from the actuator 144a and the release port 145a" of the actuator 145a so that the direct drive clutch 144 is released and the overdrive brake 145 is engaged.

The line 186 leading to the overdrive release valve 187 is normally closed by the spool 187a of the valve 187 as shown in FIG. 2. When the spool 187a is moved in the direction of arrow F, the line 186 is communicated with the lines 189 and 190 to thereby engage the direct drive clutch 144 and release the overdrive brake 145. In order to effect the aforementioned movement of the spool 187a, the line 184 is connected with the lower end portion of the spool 187a through a line 192 which has an orifice 191. Said downshifting solenoid 34 is a normally open solenoid and is provided in a drain port 192a of the line 192. It will be understood that the line 192 is normally opened to the drain port 192a so that the spool 187a of the valve 187 is held in the position shown in FIG. 2 under the influence of a spring 187b. When the downshifting solenoid 34 is energized to close the drain port 192a, a pressure is built up in the line 192 so that the spool 187a is shifted in the direction of the arrow F.

lower end of the spool 164a. Further, the pressure in the line 190 is applied to the upper end of the spool 164a. It will be understood that as the governor pressure increases beyond a predetermined value, it overcomes the force applied by the pressure in the line 190 and causes the spool 164a to move in the direction of the arrow D. Thus, the line 194 is disconnected from the line 193 and opened to the drain port to thereby cause the lock-up clutch 117 to engage.

The hydraulic system further includes a vacuum 195 for producing a throttle pressure corresponding to the opening of the throttle valve of the engine. Further, there is provided a throttle back-up valve 196 for supplementing the vacuum throttle valve 195 and a pressure modifier valve 197 for modifying the output pressure of the valve 152. The throttle pressure from the valve 195 is led through a line 198 to the 2-3 shift valve 162 and the 3-4 shift valve 163 to force the spools 162a and 163a in the valves 162 and 163 in the directions opposite to the arrows B and C. The relation of the operation of the clutches 127, 128, 137 and 144 and the brakes 131, 136 and 145 to the transmission speeds is shown in the following table.

TABLE

| SELECT VALVE | GEAR STAGE | FRONT CLUTCH 27 | REAR CLUTCH 28 | FRONT BRAKE 31 | REAR BRAKE 36 | ONE-WAY CLUTCH 37 | DIRECT DRIVE CLUTCH 44 | OVERDRIVE BRAKE 45 |
|---|---|---|---|---|---|---|---|---|
| P |   |   |   |   |   |   | o |   |
| R |   |   | o |   | o |   | o |   |
| N |   |   |   |   |   |   | o |   |
| D | 1 | o |   |   |   | o | o |   |
|   | 2 | o |   | o |   |   | o |   |
|   | 3 | o | o |   |   |   | o |   |
|   | 4 | o | o |   |   |   |   | o |
| 2 |   | o |   | o |   |   | o |   |
| 1 | 1 | o |   |   | o |   | o |   |
|   | 2 | o |   | o |   |   | o |   |

The line 185 leading to the kick-down valve 180 is normally closed by the spool 180a of the valve 180. The spool 180a of the kick-down valve 180 is shifted in the direction of arrow G when the solenoid 180b is energized, and in the shifted position of the spool 180a, the line 185 is connected with the line 181. As described above, the line 181 is in communication with the line 179 from the port d of the select valve 153 when the solenoid 180b is de-energized. The port d is opened to the drain port when the select valve 153 is in the position D so that no pressure is built up in the line 181 in this instance. When the solenoid valve 180b is energized, however, the pressure is supplied from the line 185 to the line 181 and the pressure functions to hold the spools 161a, 162a and 163a of the shift valves 161, 162 and 163 in the positions shown in FIG. 2 when the spools are in the illustrated positions. When any one or all of the spools 161a, 162a and 163a are in the positions shifted in the directions of the arrows A, B and C, the pressure in the line 181 counteracts the governor pressure applied to the spools and moves the spools to the illustrated positions when the pressure in the line 181 overcomes the governor pressure.

Figure 3:
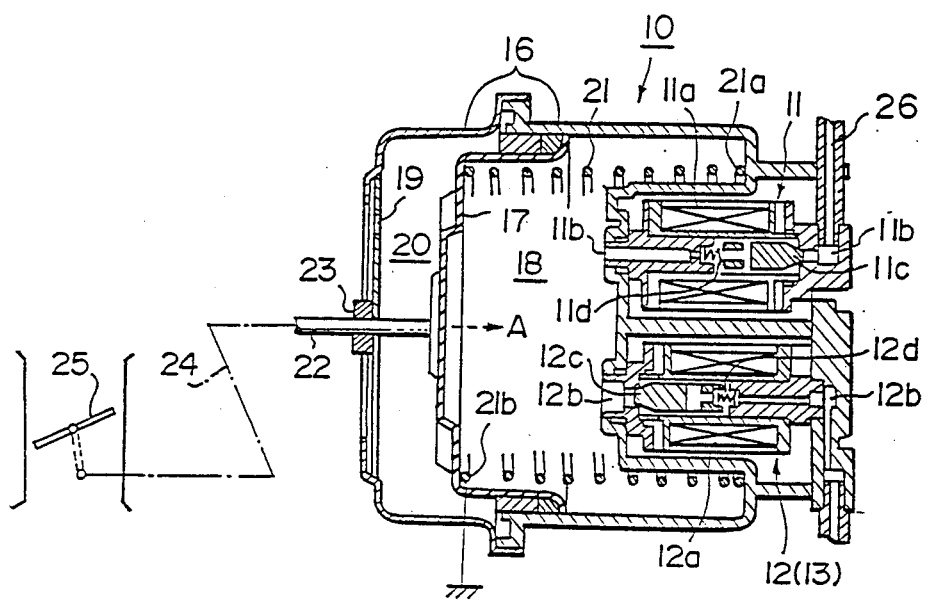
FIG. 3 is a view illustrating an example of the actuator which can be employed in the cruise control system of the embodiment of FIG. 1.

The pressure regulating valve 152 has a port which is connected to a line 193 leading to the lock-up valve 164 having a spool 164a. With the spool 164a in the position shown in FIG. 2, the line 193 is connected with a line 194 to supply a hydraulic pressure to the torque converter 110 to thereby force the lock-up clutch 117 toward the released position. As described above, the governor pressure is applied through the line 159 to the As shown in FIG. 3, said actuator 10 is of a negative pressure diaphragm type and comprises a casing 16. The internal space of the casing is parted into a negative pressure chamber 18 and an atmospheric pressure chamber 20 by a diaphragm 17 formed of rubber. The negative pressure chamber 18 is isolated from the exterior in an airtight fashion, and on the other hand, the atmospheric pressure chamber 20 opens to the atmosphere by way of a communication hole 19. The diaphragm 17 is urged toward the atmospheric pressure chamber 20 by a spring 21 disposed in the negative pressure chamber 18. A negative pressure introducing solenoid valve 11 for controlling the negative pressure to be introduced into the negative pressure chamber 18 and first and second air introducing solenoid valves 12 and 13 (only one of which is seen in FIG. 3) for introducing the atmospheric air into the negative pressure chamber 18 are mounted on the negative pressure chamber side end face of the casing 16. A rod 22 connected to the diaphragm 17 extends through the atmospheric pressure chamber 20 and is supported for sliding movement by a bearing portion 23 provided on the casing 16. The rod 22 is connected to a throttle valve 25 in the intake passage of the engine by way of a wire 24 so that the throttle valve 25 is opened in response to a movement of the diaphragm 17 toward the negative pressure chamber 18 or in the direction of arrow A in FIG. 3.

The negative pressure introducing solenoid valve 11 comprises a valve body 11c for selectively opening and closing a passage 11b one end of which is connected to a negative pressure introducing pipe 26 leading to a negative pressure source and the other end of which opens to the negative pressure chamber 18. The valve body 11c is urged by a spring 11d to close the passage 11b and is moved to open the passage 11b overcoming the force of the spring 11d when said solenoid 11a is energized. The first atmospheric pressure introducing solenoid valve 12 (the second atmospheric pressure introducing solenoid valve 13 has the same structure as the first atmospheric pressure introducing solenoid valve 12) comprises a valve body 12c for selectively opening and closing a passage 12b one end of which opens to the atmosphere and the other end of which opens to the negative pressure chamber 18. The valve body 12c is urged by a spring 12d to open the passage 12b and is moved to close the passage 12b overcoming the force of the spring 12d when said solenoid 12a is energized. Said controller 5 controls the solenoids 11a, 12a and 13a of the solenoid valves 11, 12 and 13 to control the negative pressure in the negative pressure chamber 18, thereby controlling the displacement of the diaphragm 17 to control the opening of the throttle valve 25.

When the acceleration switch 6 is turned on while the vehicle is cruising at 40 to 100 Km/h, the vehicle speed at the moment the acceleration switch 6 is turned represented by the signal from the vehicle speed sensor 9 is input into the controller 5 as the set speed, and thereafter, the controller 5 controls the actuator 10 to converge on the actual vehicle speed to the set speed while comparing the actual vehicle speed with the set speed.

That is, when the actual vehicle speed becomes lower than the set speed, the controller 5 energizes the solenoid 11a of the negative pressure introducing solenoid valve 11 and the solenoid 12a of the first atmospheric pressure introducing solenoid valve 12 to open the former solenoid valve 11 and close the latter solenoid valve 12, whereby the diaphragm 17 is displaced in the direction of the arrow A under the force of the negative pressure introduced into the negative pressure chamber 18 and accordingly the throttle valve 25 is opened by way of the rod 22 and the wire 24 to increase the amount of fuel supply to the engine. Thus, the vehicle speed is increased to converge on the set speed. On the other hand, when the actual vehicle speed becomes higher than the set speed, the controller 5 de-energizes the solenoid 11a of the negative pressure introducing solenoid valve 11 and the solenoid 12a of the first atmospheric pressure introducing solenoid valve 12 to close the former solenoid valve 11 and open the latter solenoid valve 12, whereby the diaphragm 17 is displaced in the direction opposite to the arrow A and accordingly the throttle valve 25 is closed by way of the rod 22 and the wire 24 to decrease the amount of fuel supply to the engine. Thus, the vehicle speed is decreased to converge on the set speed. The solenoid 13a of the second atmospheric pressure introducing solenoid valve 13 is normally energized to close the valve 13 during the constant speed cruising. When at least one of the selector lever position switch 14 and the brake switch 15 is turned on, the solenoids 11a, 12a and 13a are all de-energized so that the negative pressure introducing solenoid valve 11 is closed and the first and second atmospheric pressure introducing solenoid valve 12 and 13 are opened. Thus, the negative pressure chamber 18 is opened to the atmosphere to make the actuator 10 inoperative and thereafter, the throttle valve 25 is driven by operation of the accelerator pedal.

Figure 4A:
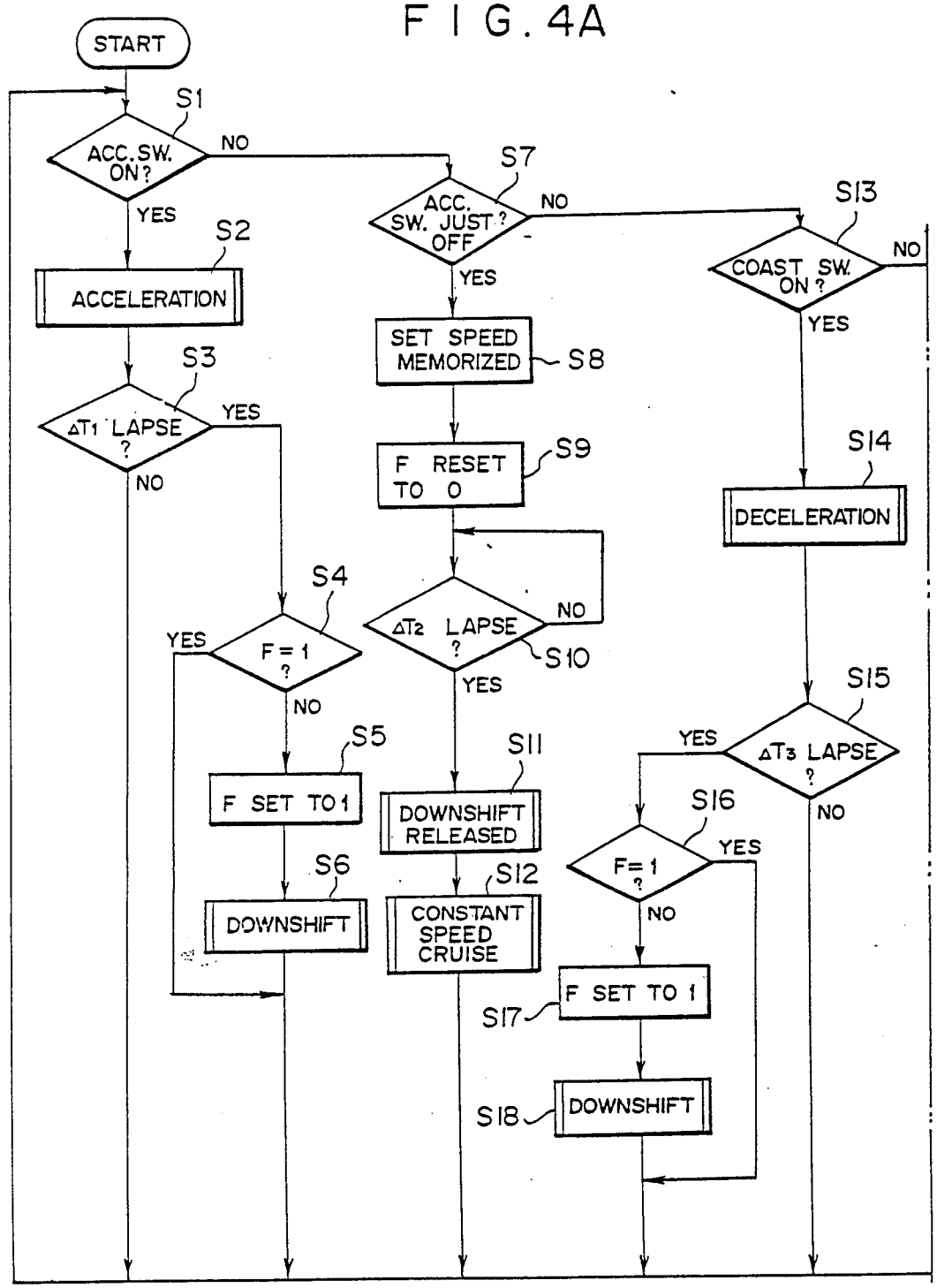
FIG. 4 is a flow chart illustrating the operation of the controller employed in the embodiment of FIG. 1 when it is in the form of a processor.

When the set speed is to be increased or decreased, the controller 5 controls the solenoid valves 11 and 12 in the similar manner to open or close the throttle valve 25 and at the same time controls the automatic transmission to downshift as required. FIG. 4 shows a flow chart for illustrating the operation of the controller 5 when it is in the form a processor.

The controller 5 first determines whether the acceleration switch 6 is on in step S1. When it is determined that the acceleration switch 6 is on, the controller 5 controls the actuator 10 to open the throttle valve 25 (step S2). When a predetermined time interval $\Delta T1$ lapses after the actuator 10 begins to be actuated by the controller 5 (step S3), the controller 5 proceeds to step S4. In the step S4, it is determined whether downshift flag F is "1", and when it is not determined that the downshift flag F is "1", the downshift flag is set to "1" in step S5. Then the controller 5 energizes the downshifting solenoid 34 to cause the automatic transmission to downshift, for instance, from fourth to third.

Thus, the automatic transmission is caused to downshift a predetermined delay time $\Delta T1$ after beginning of actuation of the actuator 10 when the vehicle is accelerated by operation of the acceleration switch 6, thereby avoiding generation of shock effects.

When it is not determined that the acceleration switch 6 is on in the step S1, it is determined whether the acceleration switch 6 was just turned off in step S7. When it is determined, in the step S7, that the acceleration switch 6 was just turned off, i.e., that the vehicle speed has been increased to a desired speed and the acceleration switch was released, the controller 5 stops the accelerating operation of the actuator 10 in steps S8 to S12. That is, in the step S8, the vehicle speed at the moment the acceleration switch 6 is turned off is memorized as the set speed and the downshift flag F is reset to "0" in the step S9. The transmission speed is returned to the original speed a predetermined time $\Delta T2$ after the acceleration switch 6 is turned off and the actuator 10 is operated to fix the vehicle speed at the set speed or to effect the constant speed cruising at the set speed (the steps S10 to S12).

When it is not determined, in the step S7, that the acceleration switch 6 was just turned off, or it is determined that a predetermined time has lapsed since the acceleration switch 6 was turned off and the operation of the steps S8 to S12 has been effected, it is determined whether the coast switch 7 is on in step S13. When it is determined that the coast switch 7 is on, the actuator 10 is actuated to reduce the opening of the throttle valve 25 in step S14. When a predetermined time interval $\Delta T3$ lapses after the actuator 10 begins to be actuated by the controller 5 (step S15), the controller 5 proceeds to step S16. In the step S16, it is determined whether downshift flag F is "1", and when it is not determined that the downshift flag F is "1", the downshift flag is set to "1" in step S17. Then the controller 5 energizes the downshifting solenoid 34 to cause the automatic transmission to downshift, for instance, from fourth to third.

Thus, the automatic transmission is caused to downshift a predetermined delay time $\Delta T3$ after beginning of actuation of the actuator 10 when the vehicle is decelerated by operation of the coaster switch 7, thereby avoiding generation of shock effects.

When it is not determined that the coaster switch 7 is on in the step S13, it is determined whether the coaster switch 7 was just turned off in step S19. When it is determined, in the step S19, that the coaster switch 7 was just turned off, i.e., that the vehicle speed has been decreased to a desired speed and the coaster switch 7 was released, the controller 5 stops the decelerating operation of the actuator 10 in steps S20 to S24. That is, in the step S20, the vehicle speed at the moment the coaster switch 7 is turned off is memorized as the set speed and the downshift flag F is reset to "0" in the step S21. The transmission speed is returned to the original speed a predetermined time $\Delta T4$ after the coaster switch 7 is turned off and the actuator 10 is operated to fix the vehicle speed at the set speed or to effect the constant speed cruising at the set speed (the steps S22 to S24). Since the transmission speed is returned to the original speed the predetermined time after the coaster switch 7 is turned off, no shocks are generated at this time. If the operating range of the vehicle after the deceleration is in the operating range corresponding to the transmission speed after the downshift, the transmission speed need not be returned to the original speed.

When it is not determined that the coast switch 7 was just turned off in the step S13, it is determined whether the resume switch 8 is on in step S25. When it is determined that the resume switch 8 is on, it is determined whether the actual vehicle speed detected by the vehicle speed sensor 9 is higher than the memorized set speed before the constant speed cruising is interrupted. That is, the resume switch 8 is for returning the vehicle speed to the set speed when the constant speed cruising is interrupted by, for instance, application of the brake. When the actual speed is higher than the set speed, the actuator 10 is actuated to reduce the opening of the throttle valve 25 in step S28. When a predetermined time interval $\Delta T5$ lapses after the resume switch 8 is turned on (step S29), the controller 5 proceeds to step S30. In the step S30, it is determined whether downshift flag F is "1", and when it is not determined that the downshift flag F is "1", the downshift flag is set to "1" in step S31. Then the controller 5 energizes the downshifting solenoid 34 to cause the automatic transmission to downshift, for instance, from fourth to third.

Thus, the automatic transmission is caused to downshift a predetermined delay time $\Delta T5$ after the resume switch 8 is turned on, when the vehicle is decelerated by operation of the resume switch 8, thereby avoiding generation of shock.

On the other hand, when the actual speed is lower than the set speed, the actuator 10 is actuated to increase the opening of the throttle valve 25 in step S33. When a predetermined time interval $\Delta T6$ lapses after the resume switch 8 is turned on (step S34), the controller 5 proceeds to step S35. In the step S35, it is determined whether downshift flag F is "1", and when it is not determined that the downshift flag F is "1", the downshift flag is set to "1" in step S36. Then the controller 5 energizes the downshifting solenoid 34 to cause the automatic transmission to downshift, for instance, from fourth to third.

Thus, the automatic transmission is caused to downshift a predetermined delay time $\Delta T6$ after the resume switch 8 is turned on, when the vehicle is accelerated by operation of the resume switch 8, thereby avoiding generation of shock effects.

When it is not determined that the resume switch 8 is on in the step S25, it is determined whether the actual vehicle speed is equal to the set speed in step S26. When it is not determined that the actual speed is equal to the set speed, the controller 5 proceeds to the step S27 and accomplishes the steps S28 to S37. This is because the resume switch 8 is not of the type which requires to be kept on but of a type in which an "on signal" is generated momentarily. Accordingly, once the "on signal" is generated, the opening of the throttle valve 25 is controlled until the actual speed converges on the set speed. The speed setting may have a certain width.

When it is determined that the actual speed is equal to the set speed, the downshift flag F is reset to "0" when a predetermined time $\Delta T7$ is lapsed after the actual speed is returned to the set speed (steps S38 and S39). When the transmission has been downshifted, the transmission speed is returned to the original speed, and then the constant speed cruising control is carried out (steps S40 and S41).

Figure 5:
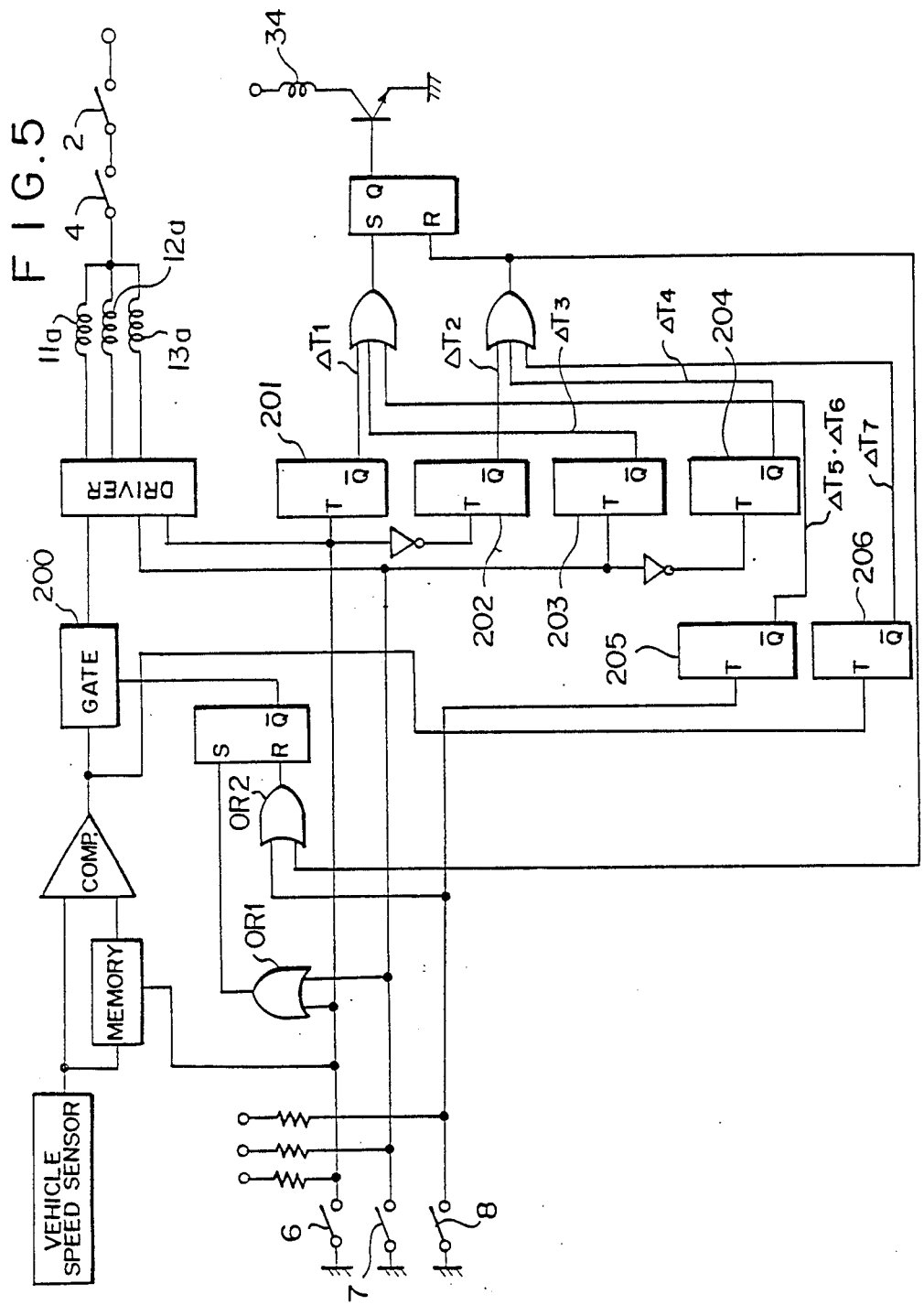
FIG. 5 is a circuit diagram of an example of the controller when it is in the form of a hard-wired logic circuit.

FIG. 5 is a circuit diagram of an example of the controller 5 when it is formed of a hard-wired logic circuit and FIG. 6 shows the relation between the condition of each switch, the transmission speed and the vehicle speed in the circuit shown in FIG. 5.

In FIGS. 5 and 6, the parts and the delay times corresponding to those described in conjunction with the flow chart shown in FIG. 4 are given the same reference numerals and symbols. The operation of the circuit shown in FIG. 5 is substantially the same as the operation described in conjunction with FIG. 4 and will be apparent to those skilled in the art, and accordingly will not be described in detail here.

In FIG. 5, when the output of OR gate $OR_1$ is "1", the $\overline{Q}$ output of flip-flop $ff_1$ is "0" and a gate 200 is closed. When the output of OR gate $OR_2$ is "1", the $\overline{Q}$ output of the flip-flop $ff_1$ is "1" and the gate 200 is opened. Monostable multivibrators 201 to 204 and 206 respectively generate the delay times $\Delta T1$ to $\Delta T4$ and $\Delta T7$. A monostable multivibrator 205 generates the delay times $\Delta T5$ and $\Delta T6$.

In the embodiment described above, the fuel supply to the engine is controlled by the throttle valve 25. However, the present invention may be applied to the engines in which fuel is injected from a fuel injection nozzle.

We claim:

1. A cruise control system for a vehicle having a multiple gear stage transmission comprising a constant speed driving device having an actuator for changing the amount of fuel to be fed to the engine, a first control means for controlling the actuator to control the amount of fuel to be fed to the engine so that the vehicle speed is fixed at a set speed, a manually operated switch means actuated for delivering to the first control means an override command for changing the vehicle speed from the set speed to a second speed determined when said manually operated switch means is released; a downshifting means for downshifting the transmission; a second control means including means responsive to the actuation of the manually operated switch for actuating the downshifting means to downshift the transmission a predetermined delay time after the manually operated switch means is operated; and said second control means including further means responsive to the release of the manually operated switch for controlling the downshifting means to return the gear stage of the transmission to the original gear stage a predetermined delay time after the vehicle speed reaches said second speed.

2. A cruise control system for a vehicle having a multiple gear stage transmission comprising a constant speed driving device having an actuator for changing the amount of fuel to be fed to the engine, a first control means for controlling the actuator to control the amount of fuel to be fed to the engine so that the vehicle speed is fixed at a set speed, a manually operated switch means for delivering to the first control means an override command for changing the vehicle speed from the set speed to a desired speed; a downshifting means for downshifting the transmission; a second control means which permits the downshifting means to downshift the transmission in response to the manually operated switch means being operated; third control means for controlling the downshifting means to return the gear stage of the transmission to the original gear stage after the vehicle speed reaches said desired speed by operation of the manually operated switch; and means for removing said override command from said first control means to fix the vehicle speed at the desired speed in response to the third control means returning the transmission gear stage to the original gear stage.

3. A cruise control system for a vehicle having a multiple gear stage transmission comprising a constant speed driving device having an actuator for changing the amount of fuel to be fed to the engine, a first control means for controlling the actuator to control the amount of fuel to be fed to the engine so that the vehicle speed is fixed at a set speed, a manually operated switch means for delivering to the first control means an override command for changing the vehicle speed from the set speed to a desired speed; a downshifting means for downshifting the transmission; a second control means which permits the downshifting means to downshift the transmission after the manually operated switch means is operated; third control means for controlling the downshifting means to return the gear stage of the transmission to the original gear stage after the vehicle speed reaches said desired speed by operation of the manually operated switch; and means for removing said override command from said first control means to fix the vehicle speed at the desired speed in response to the third control means returning the transmission gear stage to the original gear stage.

4. A cruise control system as defined in claim 1, 2, or 3 in which said actuator is of a vacuum motor type having a diaphragm moved back and forth in response to the pressure applied thereto.

5. A cruise control system as defined in claim 1 in which said transmission is an automatic transmission.

6. A cruise control system as defined in claim 5 in which said automatic transmission has an overdrive gear stage and said downshifting means is means for releasing the overdrive.

7. A cruise control system as defined in claim 5 in which said manually operated switch means comprises an acceleration switch for increasing the vehicle speed.

8. A cruise control system as defined in claim 7 further comprising means for controlling the downshifting means to return the gear stage of the transmission to the original gear stage a predetermined time after the vehicle speed reaches a desired speed by operation of the manually operated switch.

9. A cruise control system as defined in claim 5 in which said manually operated switch means comprises a coaster switch for decreasing the vehicle speed.

10. A cruise control system as defined in claim 9 further comprising means for controlling the downshifting means to return the gear stage of the transmission to the original gear stage a predetermined time after the vehicle speed reaches a desired speed by operation of the manually operated switch.

11. A cruise control system as defined in claim 5 in which said manually operated switch means comprises a resume switch for returning the vehicle speed to the set speed.

12. A cruise control system as defined in claim 11 further comprising means for controlling the downshifting means to return the gear stage of the transmission to the original gear stage a predetermined time after the vehicle speed reaches a desired speed by operation of the manually operated switch.

13. A cruise control system as defined in claim 5 in which said manually operated switch means comprises an acceleration switch for increasing the vehicle speed, a coaster switch for decreasing the vehicle speed, and a resume switch for returning the vehicle speed to the set speed.

14. A cruise control system as defined in claim 13 further comprising means for controlling the downshifting means to return the gear stage of the transmission to the original gear stage a predetermined time after the vehicle speed reaches a desired speed by operation of the manually operated switch.

15. A cruise control system as defined in claim 1 in which said first control means controls the actuator to fix the vehicle speed at the set speed after the transmission gear stage is returned to the original gear stage.

16. A cruise control system as defined in claims 2 or 3 where said second control means permits the downshifting means to downshift the transmission a predetermined time delay after the manually operated switch is operated.

17. A cruise control system as defined in claims 2 or 3 in which said transmission is an automatic transmission.

18. A cruise control system as defined in claim 17 where said automatic transmission has an overdrive gear stage and said downshifting means is a means for releasing the overdrive.

* * * * *